United States Patent
Crump et al.

(10) Patent No.: US 9,211,583 B2
(45) Date of Patent: Dec. 15, 2015

(54) SLEEVED SPROCKET TEETH

(75) Inventors: Matthew W. Crump, Cortland, NY (US); John Sarick, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 1024 days.

(21) Appl. No.: 12/562,219

(22) Filed: Sep. 18, 2009

(65) Prior Publication Data
US 2010/0081530 A1  Apr. 1, 2010

Related U.S. Application Data

(60) Provisional application No. 61/100,381, filed on Sep. 26, 2008.

(51) Int. Cl.
| | | |
|---|---|---|
| *F16H 55/30* | (2006.01) | |
| *B21K 1/30* | (2006.01) | |
| *F16H 55/06* | (2006.01) | |

(52) U.S. Cl.
CPC *B21K 1/30* (2013.01); *F16H 55/30* (2013.01); *F16H 55/06* (2013.01); *Y10T 29/49467* (2013.01)

(58) Field of Classification Search
CPC ............. B22F 2999/00; B22F 2998/00; B22F 2998/10; B22F 3/18
USPC ........................................................ 474/152
See application file for complete search history.

(56) References Cited

U.S. PATENT DOCUMENTS

| | | | | |
|---|---|---|---|---|
| 2,836,884 | A | * | 6/1958 | Graham ........................ 29/423 |
| 2,923,166 | A | * | 2/1960 | Brindley et al. ............. 474/152 |
| 3,286,329 | A | * | 11/1966 | Kumasawa et al. ........ 29/893.37 |
| 3,770,332 | A | * | 11/1973 | Dunn ............................ 384/276 |
| 4,111,031 | A | * | 9/1978 | Vennemeyer et al. .......... 72/359 |
| 4,470,290 | A | * | 9/1984 | Jungesjo ........................ 72/402 |
| 4,510,788 | A | * | 4/1985 | Ferguson et al. ............... 72/377 |
| 5,094,149 | A | * | 3/1992 | Munro ............................ 92/222 |
| 5,544,548 | A | * | 8/1996 | Iihara et al. .................. 76/107.1 |
| 5,711,187 | A | * | 1/1998 | Cole et al. ....................... 74/434 |
| 6,132,486 | A | * | 10/2000 | Dixon ............................. 75/247 |
| 6,148,685 | A | * | 11/2000 | Cadle et al. ..................... 74/457 |
| 2002/0169043 | A1 | | 11/2002 | Liu |
| 2004/0177719 | A1 | * | 9/2004 | Kosco ............................ 75/246 |
| 2005/0272546 | A1 | | 12/2005 | Reiter |
| 2007/0093329 | A1 | | 4/2007 | Greppi |
| 2007/0179002 | A1 | | 8/2007 | DeGroot |
| 2007/0270257 | A1 | | 11/2007 | Tada |
| 2009/0035169 | A1 | * | 2/2009 | Vaughn et al. ................. 419/53 |
| 2009/0275434 | A1 | | 11/2009 | Ritz |

OTHER PUBLICATIONS

ASM International, The Materials Information Society, Heat Treater's Guide, Practice and Procedures for Irons and Steels, 2nd Edition, Copyright 1995, pp. 1-2 and 760.
ASM International, The Materials Information Society, Smithells Metals Reference Book, Eighth Edition, Edited by W. F. Gale & T. C. Totemeir, Copyright 2004, pp. 1-2 and 23-15.

* cited by examiner

*Primary Examiner* — Henry Liu
(74) *Attorney, Agent, or Firm* — BrooksGroup

(57) ABSTRACT

A gear with a solid metal sleeve for its outer tooth profile is provided. The gear additionally has an inner body of sintered powder metal.

19 Claims, 4 Drawing Sheets

SLEEVED SPROCKET TEETH

CROSS-REFERENCE TO RELATED APPLICATIONS

This application claims the benefit of U.S. Provisional Application Ser. No. 61/100,381 filed Sep. 26, 2008.

TECHNICAL FIELD

The field to which the disclosure generally relates includes gears and methods of manufacture thereof, particularly geared sprockets for chain drives.

BACKGROUND

To increase fuel economy of vehicles it is desirable to lower the weight of mechanical components. To address the above noted desire many mechanical components have been fabricated from powdered metal. Although powdered metal components have been successfully utilized, it is desirable to extend the life of such components, especially those components used in power transmission applications such as gears or sprockets.

SUMMARY OF EXEMPLARY EMBODIMENTS OF THE INVENTION

One exemplary embodiment includes a gear with a solid metal sleeve for its outer tooth profile and has an inner body of powdered metal.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Referring to FIGS. 1, 2 and 3A-C a gear 10 according to the present invention has sleeve 12. The sleeve 12 is fabricated from a solid ferrous alloy such as SAE 4130 a medium carbon alloy steel or other suitable alternatives such as non-ferrous materials. The sleeve 12 can be fabricated from sheet metal or forging but in most instances, it is preferable to be fabricated from a seamless extrusion or hydroformed extrusion that is machined to a proper axial length. The sleeve 12 provides a profile of the gear or sprocket teeth 13. As shown the sleeve 12 may have a thickness between 0.15 to 1.0 mm or between 0.2 to 0.5 mm. The sleeve 12 may contain internal features such as grooves, knurling, flanges, and the like to strengthen the assembly.

Connected with the sleeve 12 is a sintered powder metal inner body 14. The sintered powder metal inner body 14 may be fabricated from a ferrous powder metal such as Iron-Copper or Iron-Nickel, or other suitable alternatives such as a non-ferrous powder metal like aluminum. Typical densities of the powder metal in its free state may range from 6.6 grams/cubic cm to 7.0 grams/cubic cm.

Figure 1:
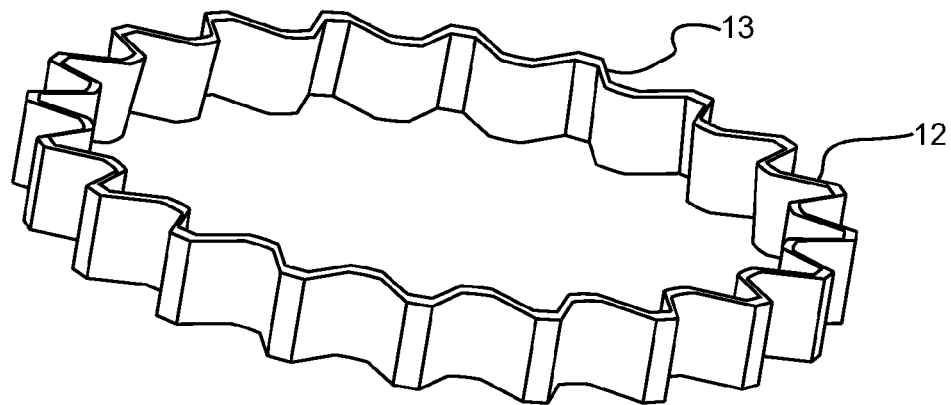
FIG. 1 is a perspective view of a sleeve utilized in the gear according to one exemplary embodiment.
Figure 2:
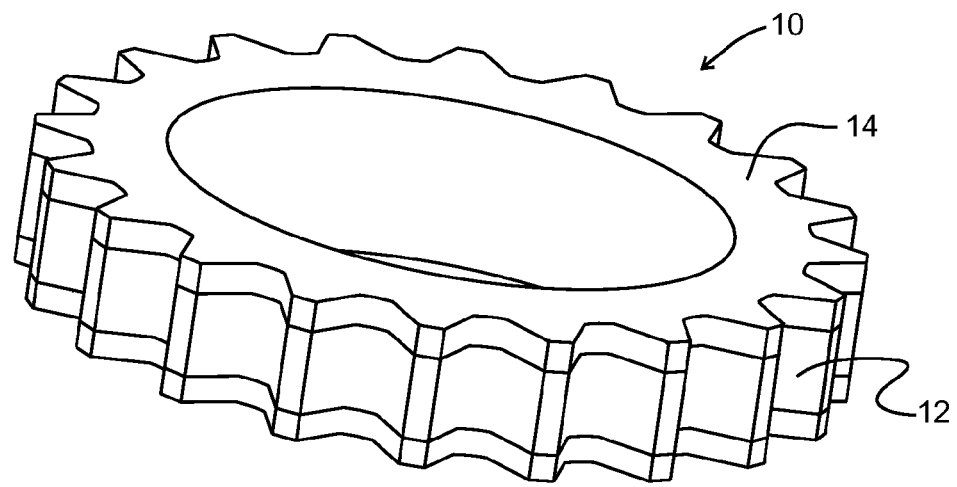
FIG. 2 is a perspective view of a gear of FIG. 1 being connected on a powder metal inner body.
Figure 3A:
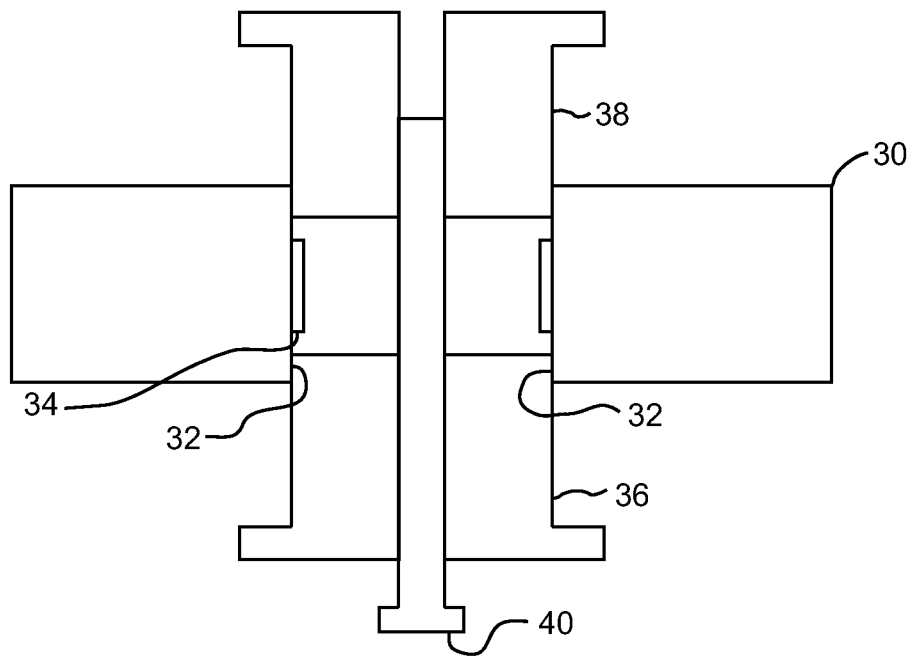
FIG. 3A is a schematic sectional view of a die press that may be utilized in manufacturing the gear shown in FIG. 2 according to one exemplary embodiment.

Referring now to FIG. 3A, according to one exemplary embodiment, to manufacture gear 10 the sleeve 12 may be first placed within a die 30. The die 30 has a central opening 32 for acceptance of the sleeve 12. The sleeve 12 may be set on a step 34 provided in the die 30 or alternatively on a lower punch 36. The sleeve 12 may be coated with a lubricant such as Gilicotte to ease ejection. The die 30 as shown is a one piece member however multiple piece member dies can be utilize. Extending between the lower punch 36 and an upper punch 38 is a core rod 40 that defines a central opening for the gear 10. After placement of the sleeve 12, powder metal may be inserted within the opening 32 to the die 30. The upper and lower punches 34 and 36 engage with the powder metal and the powder metal is compressed into the inner body 14 of the gear and is connected with the sleeve 12. After compression and density of the powder metal in one embodiment may be from 6.6 to 7.0 gram/cubic cm. Movement of the upper and lower punches is regulated so as not to crush the sleeve 12. Upper and lower punches 38, 36 are designed so that the inner body 14 is actually greater in axial length than the sleeve 12.

In another embodiment of the invention, the powder metal inner body 14 is placed in the die 30 as a previously compacted preform. Upper and lower punches cause an axial reduction in length of the preform as it expands radially to connect with the inserted sleeve 12. Both perform and sleeve 12 may be coated with a lubricant such as Gilicotte to ease ejection.

Upon joining the powder metal inner body 14 to the sleeve 12 to form the united gear 10 in the above mentioned embodiments the powder metal must undergo a sintering operation as is standard in the powder metal industry. This sintering operation will additionally form a metallurgical bond between the powder metal inner body 14 and the sleeve 12.

Figure 4:
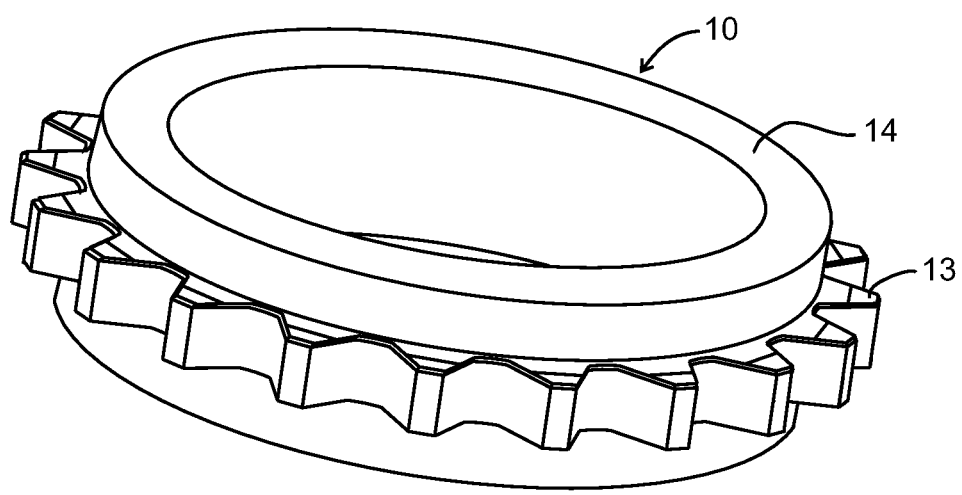
FIG. 4 is a perspective view of the gear of FIG. 2 after final machining according to one exemplary embodiment.

The gear 10 may be further machined to provide a gradual axial taper of the teeth 13 as they extend radially outward as best shown in FIG. 4.

The gear 10 may require further heat treating of either the sleeve 12 or inner body 14 or both to improve mechanical performance.

Figure 3B:
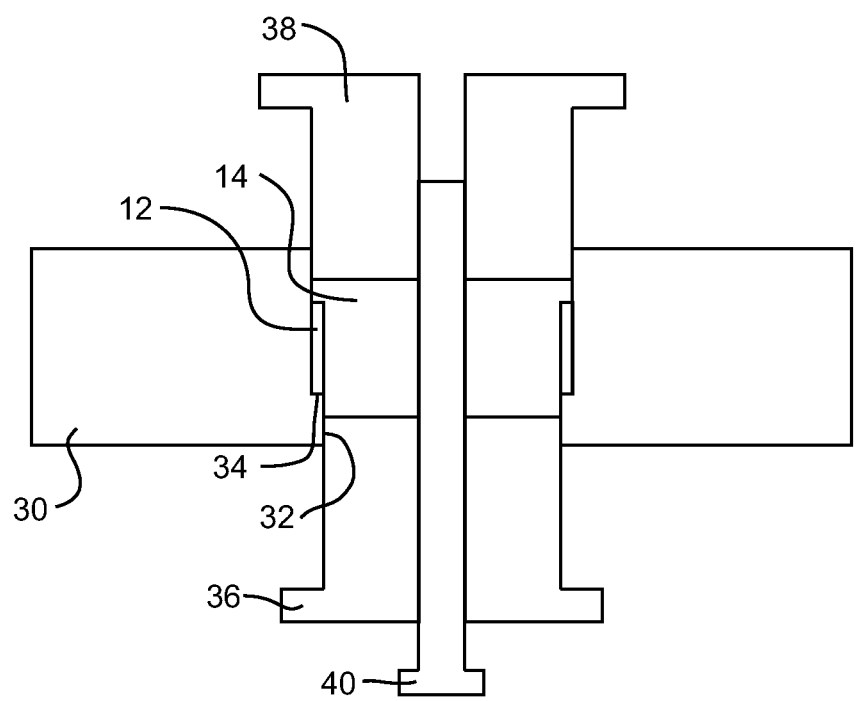
FIG. 3B is a schematic sectional view of a die press that may be utilized in manufacturing the gear shown in FIG. 2 according to one exemplary embodiment.

FIG. 3B illustrates an alternative embodiment of making the gear wherein the die 30 includes a step for supporting the sleeve 12.

Figure 3C:
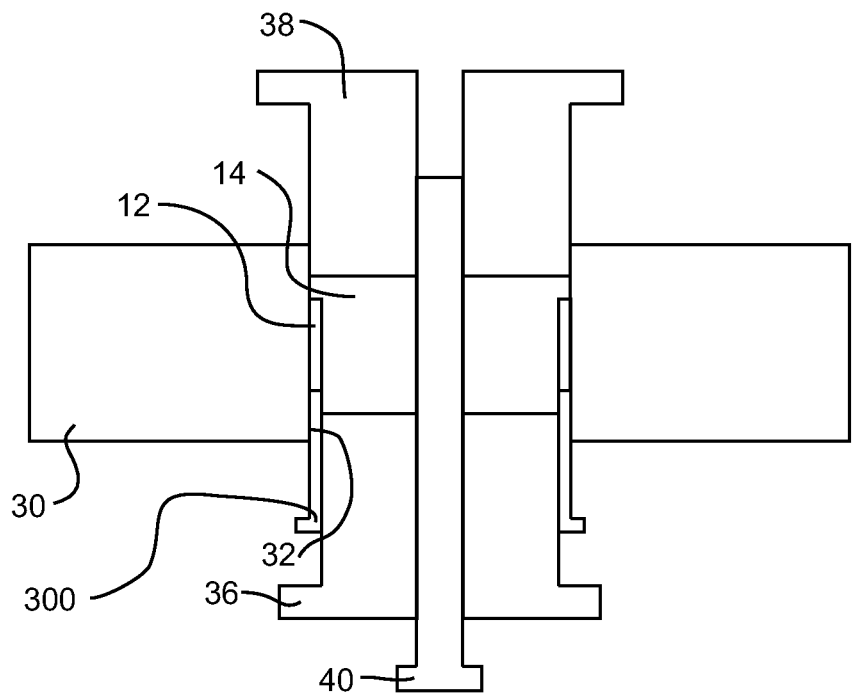
FIG. 3C is a schematic sectional view of a die press that may be utilized in manufacturing the gear shown in FIG. 2 according to one exemplary embodiment.

FIG. 3C illustrates an alternative embodiment of making the gear wherein an alternative lower punch 300 is used in combination with the die 30 includes a step for supporting the sleeve 12. The alternative lower punch may be stationary or moveable.

Figure 5:
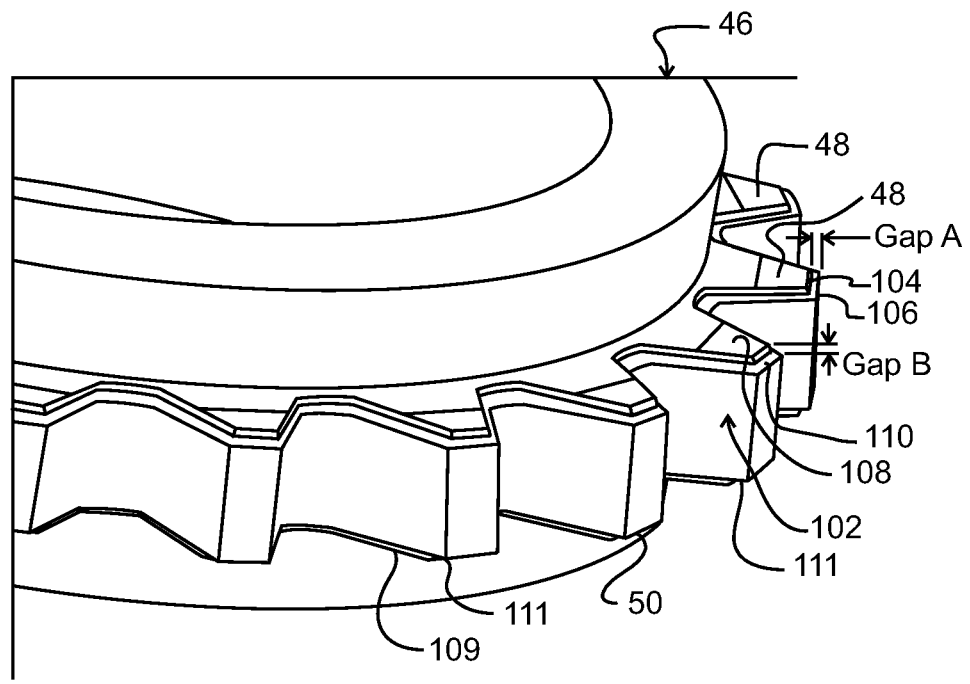
FIG. 5 is a partial perspective view of a gear according to an alternate exemplary embodiment.

Referring to FIG. 5 in another embodiment a preform powder metal inner body 14 of a gear 46 is formed in a die and is removed. The preform inner body 14 has formed thereon teeth 48. A sleeve 50 may be pressed over the inner body 14 to form the gear 46 providing an exterior wear surface for the gear teeth. An advantage of the gear 46 is that the heat treatments for the sleeve 12 and inner body 14 can be separately performed. The preform 14 may be sintered before attachment of the sleeve 12 or the preform 14 may be sintered with the sleeve 12 attached.

As shown in FIG. 5, a Gap A may be provided between the distal end 104 of the tooth 48 of the inner body 14 and a distal end 106 of the sleeve 50 formed over the distal end 104. The sleeve 12 may have first and second side faces 110, 111. Each of the teeth 48 may extend beyond each side face 110, 111 of the sleeve 12 so that a Gap B is provided between the first side face 110 of the sleeve 12 and a first side face 108 of the tooth 48, and between a second side face 111 of the sleeve 50 and a second side face 109 of the tooth 48. Gap A and Gap B may limit wear to primarily the sleeve 50.

Figure 6:
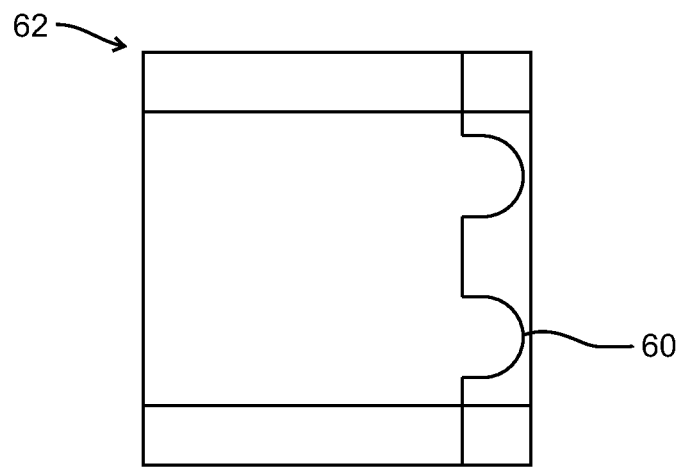
FIG. 6 is a schematic sectional view of a multiple row sprocket gear according to one exemplary embodiment.

As shown in FIG. 6 the thickness of a sleeve 60 of a gear 62 can be machined to provide a multiple row sprocket gear. Excess powder metal, if any, can also be removed in the machining operation.

The above description of embodiments of the invention is merely exemplary in nature and, thus, variations thereof are not to be regarded as a departure from the spirit and scope of the invention.

What is claimed is:

1. A method of manufacturing a gear comprising:
   forming a cylindrical solid metal sleeve providing a gear teeth profile including a plurality of teeth;
   placing said sleeve in a die;
   inserting within said die a powder metal;
   compressing said powder metal to form an inner body connected with said sleeve; and
   sintering the powder metal.

2. A method as described in claim 1 wherein said powder metal is placed in said die as a preform.

3. A method as described in claim 1 wherein said inner body has formed teeth or geometry to match the sleeve's inner geometry.

4. A method as described in claim 2 wherein said preform is processed for the delubrication before insertion into said die.

5. A method as described in claim 1 wherein said sleeve is placed on a shelf in said die.

6. A method as described in claim 1 wherein said sleeve is placed on a lower punch in said die.

7. A method as described in claim 1 wherein said sleeve is coated with a lubricant.

8. A method as described in claim 2 wherein said preform is coated with a lubricant.

9. A method as described in claim 1 wherein said sleeve and said inner body are machined after being united in said die.

10. A method as described in claim 1 wherein said sleeve is extruded and cut.

11. A method as described in claim 1 wherein said sleeve is forged.

12. A method of manufacturing a gear comprising:
    providing a solid metal sleeve having a gear teeth profile including a plurality of teeth, wherein each tooth of the sleeve has a distal end;
    placing the sleeve in a die;
    inserting a powder metal into the die;
    compressing the powder metal to form an inner body connected with the sleeve, and wherein the sleeve and the die are constructed and arranged so that the inner body includes a plurality of radially extending teeth, wherein each tooth of the plurality of radial extending teeth of the inner body having a distal end aligned with the distal end of a tooth of the sleeve.

13. A method of manufacturing a gear comprising:
    providing a solid metal sleeve having a gear teeth profile including a plurality of teeth, wherein each tooth of the sleeve has a distal end and a first side face and a second side;
    placing the sleeve in a die;
    inserting a powder metal into the die;
    compressing the powder metal to form an inner body connected with the sleeve, and wherein the sleeve and the die are constructed and arranged wherein the so that the inner body includes a plurality of radially extending teeth, wherein each tooth of the plurality of radial extending teeth of the inner body having a distal end and a first side face and a second side face, and wherein the first side face of each tooth is spaced a distance from both the first and second side faces of the tooth joined thereto, forming a gap between the distal end of the tooth and a distal end of the sleeve.

14. A method as set forth in claim 13 wherein the sleeve and the die are constructed and arranged so that a second gap is formed between a first side face of the sleeve and a first side face of the tooth and between a second side face of the sleeve and a second side face of the tooth.

15. A method as set forth in claim 13 wherein the sleeve and the die are constructed and arranged wherein the so that the distal end of a tooth of the sleeve is spaced a distance from the distal end of inner body tooth joined thereto.

16. A method of manufacturing a gear comprising:
    providing a solid metal sleeve having a gear teeth profile including a plurality of teeth, wherein each tooth of the sleeve has a distal end;
    placing the sleeve in a die;
    inserting a powder metal into the die;
    compressing the powder metal to form an inner body connected with the sleeve, and wherein the sleeve and the die are constructed and arranged wherein the so that the inner body includes a plurality of radially extending teeth, wherein each tooth of the plurality of radial extending teeth of the inner body having a distal end, and wherein the distal end of a tooth of the sleeve is spaced a distance from the distal end of inner body tooth joined thereto.

17. The method of claim 1 wherein each tooth of the plurality of teeth has a distal end, a first side face, and a second side face and the sleeve includes a distal end, a first side face, and a second side face.

18. The method of claim 17 wherein a gap is disposed between the distal end of each tooth and the distal end of the sleeve.

19. The method of claim 17, wherein the plurality of teeth extend beyond the first and second side faces of the sleeve such that a gap is provided between the first side face of the sleeve and the first side face of each tooth and between the second side face of the sleeve and the second side face of each tooth.

* * * * *